United States Patent
Garner et al.

(10) Patent No.: US 7,231,639 B1
(45) Date of Patent: Jun. 12, 2007

(54) SYSTEM AND METHOD FOR MANAGING DATA OUTPUT

(75) Inventors: Michelle Patrice Garner, Longwood, FL (US); Andrew Stephen Kronstadt, DeBary, FL (US); William Cordt Huneke, Maitland, FL (US); Rita WS Chan, Oviedo, FL (US)

(73) Assignee: Convergys CMG Utah, Salt Lake City, UT (US)

( * ) Notice: Subject to any disclaimer, the term of this patent is extended or adjusted under 35 U.S.C. 154(b) by 535 days.

(21) Appl. No.: 10/345,003

(22) Filed: Jan. 15, 2003

Related U.S. Application Data (60) Provisional application No. 60/360,343, filed on Feb. 28, 2002.

(51) Int. Cl.
G06F 3/00 (2006.01)
G06F 9/44 (2006.01)
G06F 9/46 (2006.01)
G06F 13/00 (2006.01)

(52) U.S. Cl. .................................. 719/310; 717/106

(58) Field of Classification Search ........ 719/328–330, 719/310–320, 321, 327; 707/204, 203; 711/162; 386/95, 125, 168; 717/100–119
See application file for complete search history.

(56) References Cited

U.S. PATENT DOCUMENTS

| | | | |
|---|---|---|---|
| 5,386,545 A * | 1/1995 | Gombos et al. ............ 707/204 |
| 5,522,037 A * | 5/1996 | Kitagawa et al. ............. 714/40 |
| 5,613,097 A * | 3/1997 | Bates et al. ..................... 707/3 |
| 5,671,439 A | 9/1997 | Klein |
| 5,732,269 A | 3/1998 | Compton |
| 5,870,725 A | 2/1999 | Bellinger |
| 5,921,582 A | 7/1999 | Gusack |
| 5,926,836 A * | 7/1999 | Blumenau .................... 711/162 |
| 6,496,839 B2 * | 12/2002 | Cabrera et al. ............. 707/203 |
| 6,546,474 B1 * | 4/2003 | Weigelt ....................... 711/162 |
| 6,882,795 B1 * | 4/2005 | McMurdie et al. ......... 386/125 |
| 2002/0103889 A1 * | 8/2002 | Markson et al. ............ 709/223 |

FOREIGN PATENT DOCUMENTS

| WO | WO 0036536 | 6/2000 |
|---|---|---|
| WO | WO 0077685 | 12/2000 |

OTHER PUBLICATIONS

Archive Storage Subsystem for the ESO VLT, Dunn et al., http://monet.astro.uiuc.edu/adass98/Proceedings/dunnjs1/.

SGI Open Vault, http://www.sgi.com/software/openvault/whitepaper.html.

* cited by examiner

*Primary Examiner*—William Thomson
*Assistant Examiner*—Diem Cao
(74) *Attorney, Agent, or Firm*—Frost Brown Todd L.L.C.

(57) ABSTRACT

A method and system are described in which an application is modified to produce a trigger file wherein the trigger file includes a data media indicator. A mediator accepts the trigger file and selects a target module which interfaces with a target media device to process a data file on the target media device.

11 Claims, 7 Drawing Sheets

SYSTEM AND METHOD FOR MANAGING DATA OUTPUT

This is a non-provisional patent application which claims priority from U.S. Provisional Patent Application 60/360,343 which was filed on Feb. 28, 2002.

FIELD OF INVENTION

This invention is in the field of data media production.

BACKGROUND

A need exists to provide data/output from computerized applications/software products to external sources (clients, other vendors, and partners) in a variety of media. As technological advances in media devices occur (i.e., movement from tape media to CD-ROM or DVD media), a need is, created to allow both legacy and newly developed applications to take advantage of such media. In the past, it has been necessary to directly customize such applications to interface with such third party media devices. It may even have been necessary to provide dedicated third party media devices for these applications. This solution is both cost and labor intensive. This solution becomes even more cumbersome when it is multiplied across all of the applications/systems in use within a given organization. Furthermore, the entire process must be repeated each time an alternative output media is chosen.

Other prior art systems provide proprietary interfaces which facilitate the routing of application data from a specific application to one or more specific output media devices (see, U.S. Pat. No. 5,870,725 issued to Bellinger). These systems, however, are restricted to a predefined source database and require the use of intermediary conversion programs to format the data according to proprietary standards before such data may be produced on the desired media. Furthermore, these systems are not extensible to facilitate the production of different or new types of media.

Therefore, a need exists to provide a flexible and generic method and system for processing output media requests for a variety of media devices across a variety of applications. Furthermore, the system and method must be easily upgradeable to facilitate the addition of newly created media devices.

SUMMARY OF THE INVENTION

Figure 7:
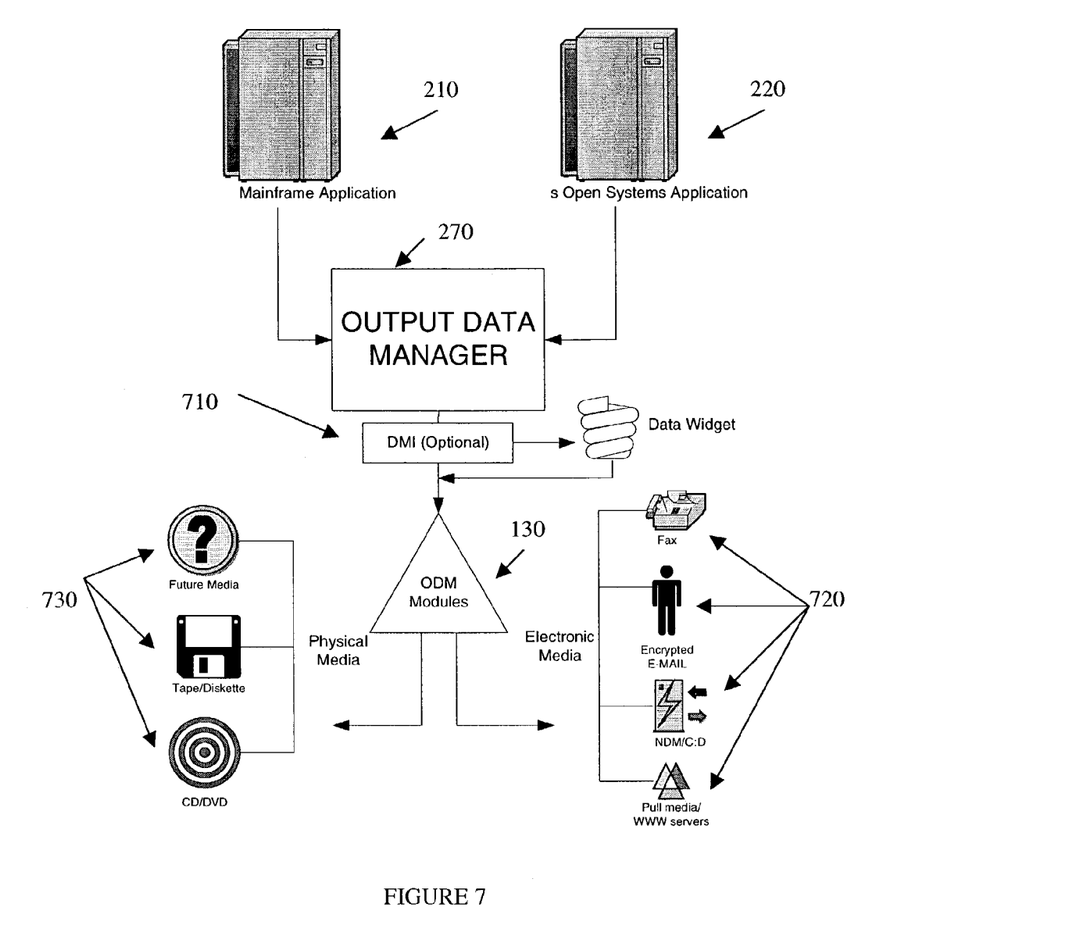
FIG. 7 illustrates a high-level overview of an embodiment of the system.

Embodiments of the system and method disclosed in this application address a need in the industry for a robust method and system for creating custom data media from any source data, in any format, from any system or application. Data media include both tangible/physical and intangible forms of output including paper, disk, CD/DVD, file transmission, recordings, and et cetera (see also, FIG. 7). The embodiments disclosed herein are designed with the flexibility to meet the ever-changing output media needs of any industry in a cost-effective, efficient manner.

Embodiments of the invention include a computerized method for facilitating the creation of data media comprising the steps of modifying a source system to produce a trigger file in a predefined format further comprising at least one data media indicator. A source system includes the gambit of computerized applications/programs/systems that produce some kind of output. It may comprise one or more applications working in concert with each other.

Next, the modified source system may send the trigger file to a mediator with an output/source data file produced by said source system. The term "trigger file" has been developed for use in this application to indicate the additional output produced by the modified source system which defines the parameters for the data media to be created. The trigger file could potentially be incorporated into the normal output of the source system but has been separated here for ease of understanding. The "source data file" refers to the output normally produced by the source system. The mediator analyzes the data media indicator on the trigger file. The "data media indicator" may simply be a field which designates the type(s) of data media to be created. The mediator selects a target media module corresponding to the data media indicator wherein the target media module utilizes an interface revealed by an associated target media device. The "target media module" comprises one or more computer programs that are designed/coded to interface with third party media devices and effect the creation of data media incorporating the source data file on such devices. The "interface" includes a programming interface, consisting of the set of statements, functions, options, and other ways of expressing program instructions and data provided by a program or language for a programmer to use in coding the target media module. The target media module processes the source data file on the target media device through the interface. The "target media device" comprises any system capable of producing data media (see FIG. 7 for non-limiting examples of target media).

Embodiments of the invention also include a computerized system for facilitating the creation of a data media comprising a modified source system, a mediator, and a target media module. The modified source system may be configured to produce a trigger file in a predefined format which further comprises at least one data media indicator. The source system may send a source data file produced by said source system and said trigger file to said agent. The mediator may analyze said data media indicator on said trigger file. The mediator also selects a target media module corresponding to said data media indicator. The target media module may utilize an interface revealed by an associated target media device. The target media module may process the source data file on said target media device through said interface.

In another embodiment, a computerized method for facilitating the creation of output, comprising information/data from the source data file, on a medium (the medium comprising the source data may also be known as the data media) comprises modifying a source application to produce a trigger file in a predefined format further comprising at least one data media indicator. The modified source application/system may be run to produce said trigger file and at least one source data file. The source system sends the trigger file and said at least one source data file to a mediator. The mediator comprises a set of computer-executable instructions configured to interpret said trigger file and a set of parameters included in the trigger file including the, at least one, data media indicator. The mediator analyzes the at least one data media indicator on the trigger file. The mediator selects and initiates a target media module corresponding to the, at least one, data media indicator wherein the target media module utilizes an interface revealed by an associated target media device. The target media module processes the, at least one, source data file on the target media device through said interface to produce media comprising said at least one source data file. In a variation of this model, the mediator comprises at least one target media module. In a further variation of this model, additional (different) target media devices may be accommodated by coding additional target media modules to correspond to said additional target media devices. This may be accomplished by defining a data media indicator to be associated with said additional target media module and storing said target media module in a computer-readable memory, any computer-accessible form of memory is acceptable here whether in hard copy (CD), stored in a hard drive, RAM, etc.

The "mediator" comprises a computerized system/program/set of computer-executable instructions which may be/have been designed to accept a source data file and parameters for the creation of a specified media(s) and then proceeds to process said source data file through a target media module designed for a specific target media device.

In another variation of the methods described herein, the mediator may be further configured to act as a router. A router may act to determine the next point to forward a request to and be a connection point between one or more networks. The mediator may also select and initiate a target media module stored on a remote server. This facility is useful where the source data file/output is generated on a computer system in one city and the media is created on equipment in another city (see FIG. 1).

The mediator may be further configured to initiate processing on more than one target media module substantially simultaneously. "Substantially simultaneously" should be taken to account for delays/lags in computer processing and network traffic but should also include where such initiation is simultaneous.

In another embodiment, a computerized system for facilitating the creation of output on a medium comprises a source application, a mediator, and a target media module. The source application may include computer-executable instructions configured to produce a trigger file in a predefined format which further comprises at least one data media indicator. The source application further comprises computer-executable instructions configured to send at least one source data file produced by said source application along with said trigger file to said mediator. The mediator comprises computer-executable instructions configured to analyze said data media indicator on said trigger file. The mediator further comprises computer-executable instructions configured to select a target media module corresponding to said data media indicator. The target media module comprises computer-executable instructions configured to utilize an interface revealed by an associated target media device. The target media module comprises computer-executable instructions configured to process said source data file on said target media device through said interface.

In a variation on the models described herein, the source application may further provide a user interface which permits a user to specify a set of parameters for said trigger file. The user interface may comprise a set of operating system commands, graphical display formats, and other devices provided by a computer or a program to allow the user to communicate and use the computer or program. A graphical user interface provides its user a more or less "picture-oriented" way to interact with technology.

In a further variation on the models described herein, the source application may further automatically generate a set of default parameters for said trigger file based on a request to produce media on a particular media device by a user. This is intended to improve processing speed by forcing the user to only input those parameters that are specific to the job they wish to process. This way the user does not have to spend time entering common parameters each time they wish to process a job.

In a further variation on the models described herein, the mediator may comprise a computerized agent which is configured to monitor a server configured to receive at least one job request from said source application. The agent is simply a separate routine, sub-routine, program, module, etc. comprising computer-executable instructions designed to monitor when requests are received and process them accordingly. The mediator may further determine if said at least one source data file must be fragmented (broken up, divided) to be produced on media corresponding to said data media indicator and, if so, fragment said source data file.

In another variation on the models described herein, the agent may be further configured to perform customized data manipulation to a set of data existing on said at least one source data file. Customized data manipulation may include any type of reformatting, addition/deletion/modification of data according to predetermined rules, organization of such data, etc.

In another embodiment, a computerized system for facilitating the creation of output on a medium comprises a source application, a mediator, and a target media module wherein an at least one source data file produced by said source application is sent to said mediator. A trigger file may be created wherein said trigger file comprises a set of parameters, in a predefined format, relating to media production which further comprises at least one data media indicator and wherein said trigger file is sent to said mediator to be processed with said source data file. The mediator comprises computer-executable instructions configured to analyze said data media indicator on said trigger file; said mediator further comprises computer-executable instructions configured to select a target media module corresponding to said data media indicator; said target media module comprises computer-executable instructions configured to utilize an interface revealed by an associated target media device. The target media module comprises computer-executable instructions configured to process said source data file on said target media device through said interface via said target media module.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE EMBODIMENTS

Embodiments of the invention are provided for a method and system for computer applications to create media including, but not limited to, CD-ROM, DVD, tape, C:D/NDM, and/or encrypted e-mail on target media devices configured to produce said media. The solution depicted herein may be particularly suited to a service bureau environment but may be adapted for use in other environments. Various embodiments of the system and method depicted herein may be referred to as "Output Data Manager" or "ODM".

Embodiments of the system and method may be developed to run on multiple platforms including AIX, HP/UX, TRU64, Linux and Solaris. Other embodiments may be developed for alternative platforms, i.e., Windows NT, et cetera.

Various components of the system and method may be distributed across multiple servers. One embodiment of the system and method may comprise three stages of functionality: agent, mediation, and module. It may also be possible to combine the functionality of the agent and mediator in one stage, which may also be referred to as agent. Embodiments of the invention may comprise one server/computer to provide these stages of functionality or may combine all or various portions of the functionality on single servers/computers.

Figure 1:
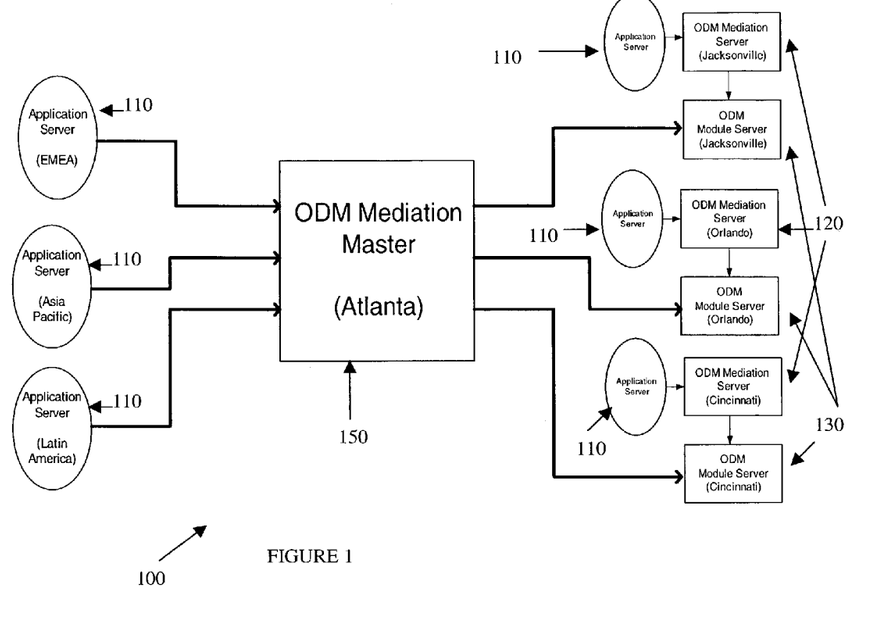
FIG. 1 illustrates a depiction of one embodiment of the invention deployed over a wide area network or other type of network.

Referring to FIG. 1, embodiments of the system and method may be set up locally or over a network. One configuration (100) shows local applications (110) feeding a centralized mediation server/agent (150), which connects to remote module servers (130). In another embodiment, local applications (110) may feed local mediation servers/agents, (120) which are connected to local module servers (130). This configuration illustrates how the system and method may be used to provide a single, centralized solution for data media creation, on virtually any scale, thereby eliminating the investment necessary to support target media devices/media types within source systems/applications, both code-wise and equipment-wise. The source system may be any application or computer system that produces output/source data file (i.e., Microsoft Word produces a Word document; a proprietary program produces data in a proprietary format).

Figure 2:
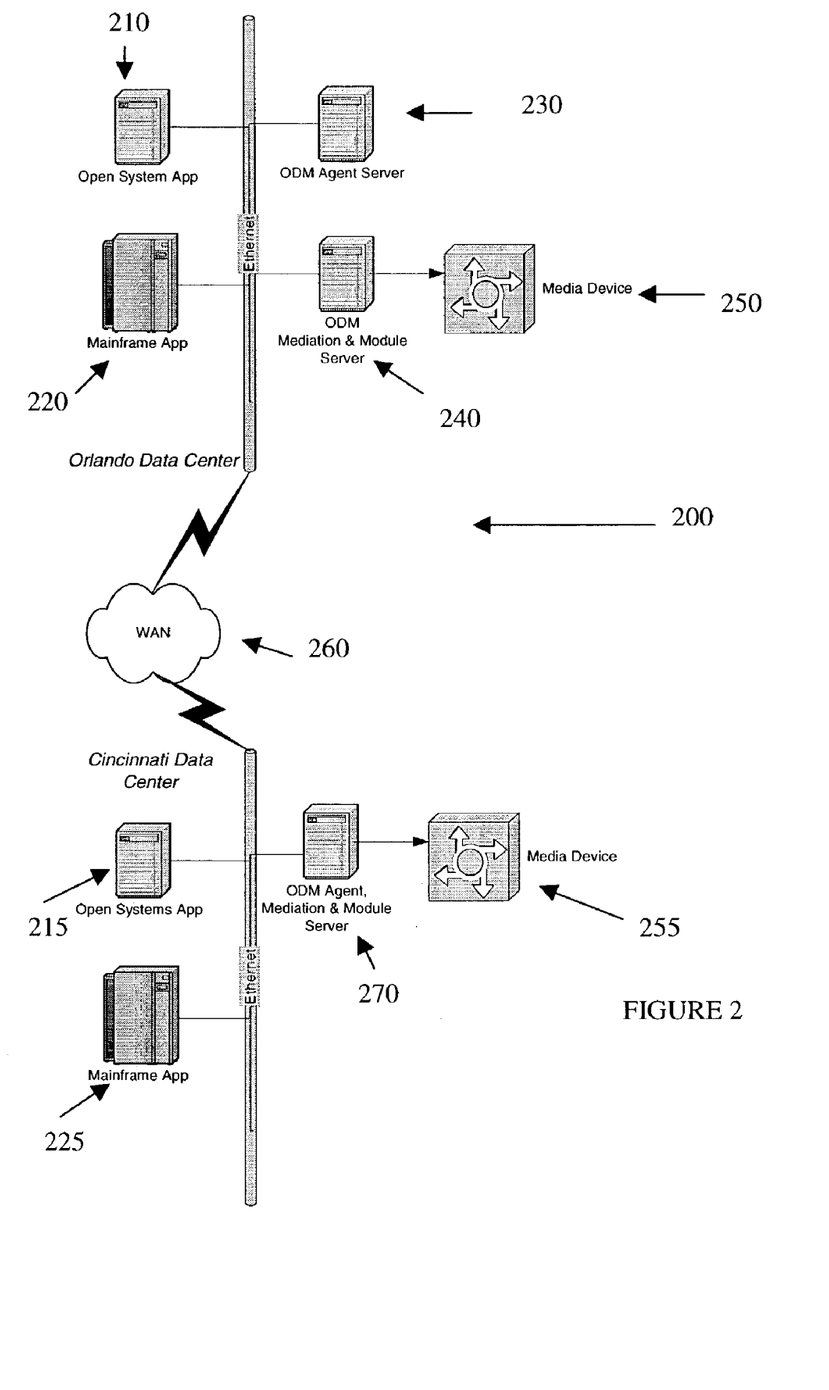
FIG. 2 illustrates a redundant embodiment of the system deployed over a wide area network.

Referring to FIG. 2, embodiments of the system and method may be configured to allow a redundant server (270) to be connected/in communication with another server (240) over a network (270) so that, if one server fails, jobs may be redirected to the alternative site.

Embodiments of the system and method may be integrated as a router between a source system and a media system; however, these embodiments comprise a generic, non-proprietary solution. Because embodiments of the system and method may be set up in a non-proprietary fashion, a job request may designate a different medium for the output of a given source application without recoding the source application to interface with the new target media device. If necessary, a new media type may be defined and a new media-specific module may be coded for integration into the module server. An embodiment of the method and system may comprise an application programming interface (API)/trigger file comprising instructions on a computer readable medium for the creation of output media, an agent, a mediator and target modules. Each of these components comprise computer-executable instructions encoded on a computer readable medium.

Figure 3:
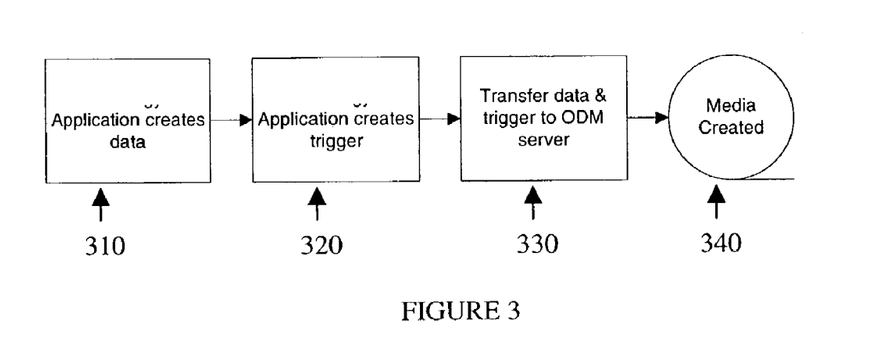
FIG. 3 illustrates a high-level flowchart of the method employed by an embodiment of the system.
Figure 4:
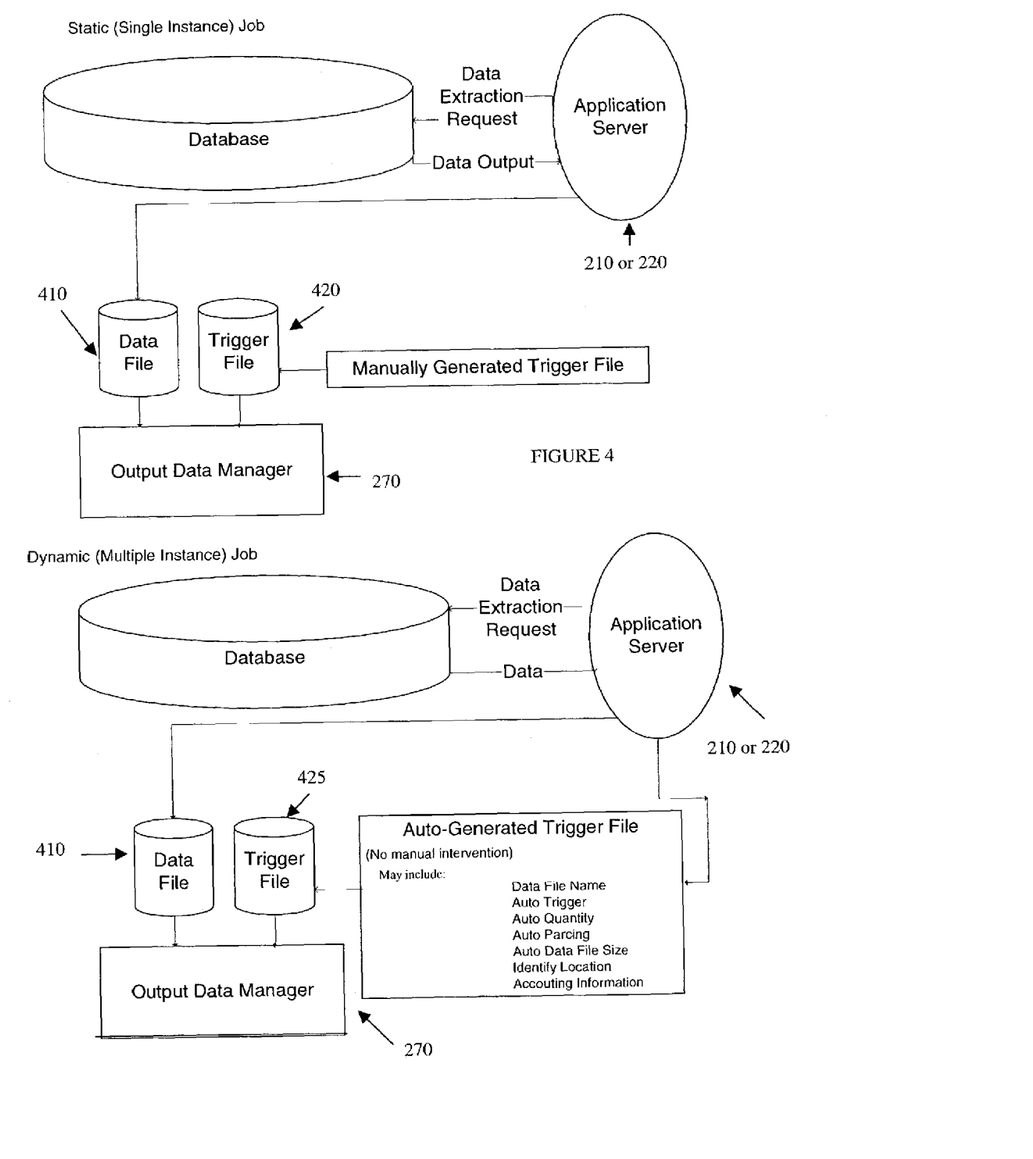
FIG. 4 illustrates two embodiments of the system in which one embodiment utilizes a manually generated trigger file and the other embodiment utilizes an automatically generated trigger file.

Referring to FIGS. 3 and 4, a high-level depiction of an embodiment of the system and method is presented. The source application may be modified to produce (320) a trigger file (425) along with its normal output (310)(410). A graphical user interface or other interface may also be provided to allow a user to interact with the source application (210/220) and specify specific values for the parameters of the trigger file (425) (the development of such interfaces is well within the ordinary skill of the art). The source application may also be coded so that the source application (210–220) will determine specific real-time or default values for the parameters of the trigger file (425) when a request is made. One may also manually generate the trigger file (420) and then transfer it to the server (270) to be processed with the output file (410) of the source application (210/220). The specific parameters for the trigger file (420/425) may be determined by the developer of the system but should be generic enough to facilitate the production of a broad array of media. Various embodiments of potential trigger files (420/425) are further described in this application. The remediation necessary to modify the source application (210/220) to produce the trigger file (420/425) is well within the scope of those skilled in the programming arts and will vary depending on the source application. Once the source application (210/220) has produced the output/data file (410) and the trigger file (420/425), these are transferred to the agent/mediation/module server(s) (330). The agent/mediation/module server(s) (330) facilitates the creation of the chosen media (340).

Trigger File

Figure 5:
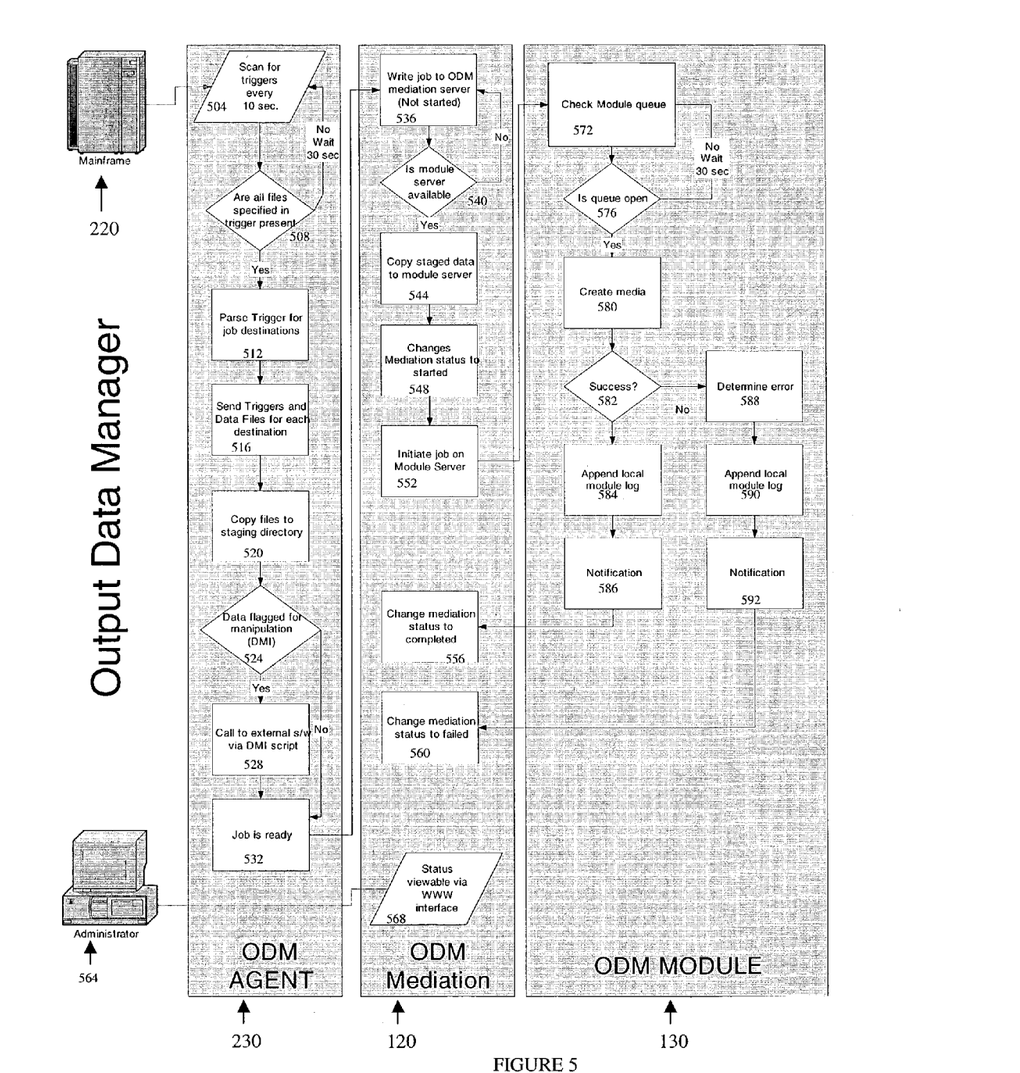
FIG. 5 illustrates a flowchart of an embodiment of the system and method.

Referring to FIG. 5, the API or trigger file provides instructions for media creation. New media types and processes can easily be added by adding new media type codes to the existing definition. Transference of the source application's output/data file and the trigger file to the agent (230) may be fully automated using extraction and transmission processes that are within the scope of the computer arts. The agent (230) may act as a listener waiting for new jobs to be transferred (504) to the agent's server. The agent (230) may be configured to do routine error checking (508). The agent may parse the trigger files and determine which modules to execute (512). The target modules (130) may be media specific routines that may be run either locally or remotely. In one embodiment, these modules (130) may be run independently of the agent (230) so that module abends will not affect processing for other media creation jobs. The target modules (130) are designed to interface with the APIs exposed by third-party media creation tools such as Rimage CD creation towers, PGP encryption tools, e-mail softwares, and Connect:Direct/NDM. The creation of target modules is within the ordinary skill of the computer arts and will vary according to the chosen media device.

It should be appreciated that the set-up of the trigger file (420/425) is within the discretion of the developer as are any naming conventions chosen to facilitate these processes. The flexibility of the system, however, may be enhanced by conforming to certain standards in the trigger file. The trigger file may be configured to support any number of destination records and is only restricted by the overall system/network limitations. Instructions within the trigger file (420/425) may be delineated by using a common delimiter such as a comma to indicate separation between variables and a line-feed character to indicate the end of a record.

In another embodiment, the trigger file (420/425) may comprise output destination records and data file records. The output destination records may comprise instructions regarding the media to be created and the data file records may comprise instructions regarding the data files to be processed.

The output destination records may comprise the following instructions: a predefined variable to indicate that the record is an output destination record (i.e., FLAT or OUTPUT), a predefined variable (alphanumeric, etc.) to indicate the media type desired (i.e., IE: "I"=ISO9660 CD-ROM, "N"=NDM) (data media indicator), the number of copies desired (1-XX), a label (i.e., CD artwork) for the media to be produced (the naming convention for this file may be dependent on the type of media chosen, i.e., "xxxxxxxx.btw" for CD-ROM or Snode/snodeid for NDM), a variable to indicate whether the file associated with the label (i.e., a bitmap for CD artwork) is included with the trigger file or is locally present on the media device. Other embodiments may configure the trigger file to provide more robust functionality by containing additional instructions such as an indicator specifying whether the output file should also be archived for long term storage; e-mail addresses to send a 'media creation complete' notification (multiple addresses should be separated by an alternative delimiter), a geographic routing indicator (alphanumeric) to support using a single server to send jobs to geographically disparate module servers, and/or a variable to indicate that a transmittal/routing sheet should be printed when the job is complete. If the transmittal indicator is positive, it may be necessary to include a file containing the routing information to be sent along with the trigger file and the data file.

The data file records comprise the data file information. These records represent the output file(s) from the source system that will be transferred to the desired media (mediums). Any number of data file records may be included on a given trigger file. These records may include one or more of the following descriptors: an indicator to alert the agent that it is processing a data file record as opposed to an output record (the indicator may contain additional information as well such as whether or not the file is compressed) and the local data file/archive file name (i.e., xxxxxxxx.yyy). The trigger file may be configured to support the creation of media for multiple data files by including these file names in the trigger file. The data file name(s) may be listed in a particular format (i.e., xxxxxxxx.yyy format, all lower case).

The system and method may be further modified to provide a field in the trigger file (which may be processed by the agent) to indicate that the agent should break the data file(s) into small chunks/packets before producing them on the specified medium(s). Alternatively, the trigger file may be modified to include the record size in bytes and the agent may be configured to automatically determine whether splitting is necessary.

Where the trigger file is a flat file comprising delimited instructions, it may be necessary to program the source applications to create the instruction fields present in the trigger file in a consistent order. It should be recognized, however, that the trigger file may be created using a variety of techniques to identify the different instructions including fixed length, XML tags, proprietary mechanisms, or other methods.

In one embodiment, a naming convention may be followed to facilitate the tracking of jobs run over the method and system. For instance, the trigger file naming convention [xxxxxxxx.NNNN.xxxxxxxx.cdx] may be used where xxxxxxxx may be any 8 lower case characters and NNNN is an associated project tracking code. A project tracking code may be used to facilitate cost reporting for a given source application or customer.

Overview of Architecture

Referring to FIG. 5, a more detailed depiction of one embodiment of the method and system is shown. The agent may scan for incoming jobs (504), perform error checking (508), parse the trigger file (512), and send the data file to a mediation server (516). The agent may be further configured to copy the data files to a staging directory (520) to perform more advanced error checking on the data files to confirm that they are appropriate for the particular media chosen. These checks may conform with industry standards for the given media type (i.e., a data file for a CD should be at least 600 KB, file format limitations for faxes, and code page type limitations for e-mail).

Figure 6:
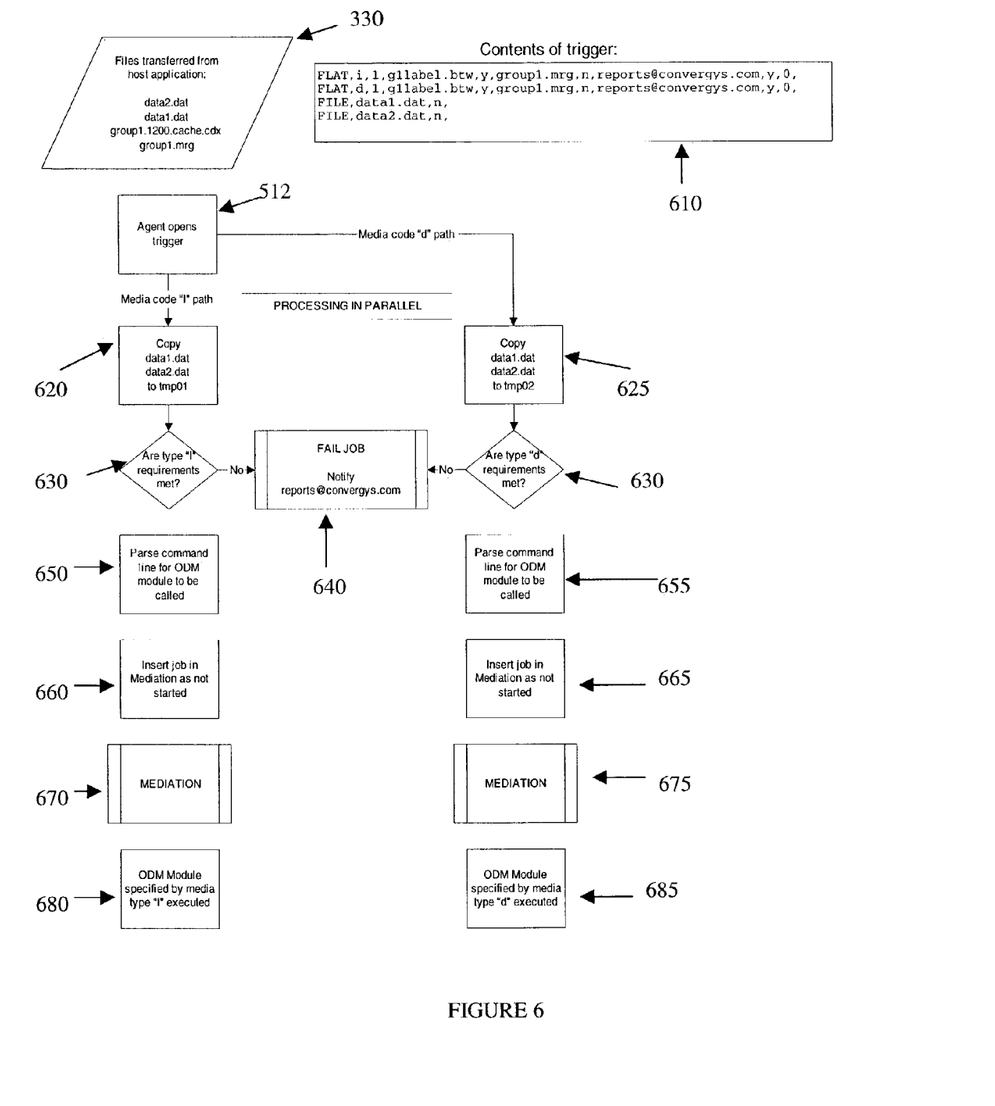
FIG. 6 illustrates a flowchart demonstrating the parsing of a trigger file.

Referring to FIG. 6, more than one media type may be specified in the trigger file. When the agent (230) parses (512) the trigger file (420/425), it may be configured to initiate parallel processing for data files designated for production on multiple media types.

The system and method may be further configured to provide an optional Data Manipulation Interface (DMI) (524). In one embodiment, the system and method acts in an agnostic fashion and simply shuttles the data files to the appropriate module (130) based on the instructions in the trigger file (420/425). In another embodiment, the DMI provides an open element of the system that may allow for custom data manipulation, extraction, and conversion routines (528). These routines may be proprietary or may be commercial third party tools (for instance, a predefined flag may indicate to the agent that particular delimiters need to be added to the data file to facilitate use by the end user). The data file records in the trigger file (420/425) may be configured to provide an indication to the agent that the data, files should be manipulated (i.e., an alphanumeric data conversion indicator) (524).

The mediation server (120) may serve as the gatekeeper/coordinator for all media generation processes. The mediation server (120) may be configured to send jobs to available Module Servers (544) and track job progress (548/556/560). In one embodiment, the mediation server may comprise an external interface (568) for Job Administrators (564) to check the status of a particular job (i.e., over the Internet). An interface may also be provided to monitor job queues. Job completion notifications may be made via email or by proprietary routines (586/592).

The mediation server may also be configured to transfer jobs to geographically disparate mediation servers and/or facilitate job creation in remote locations. This functionality may also be used as a fail-safe for the module servers (130).

The mediation server initiates the correct module (target media module) based on the media code passed from the trigger file (552). The modules (130) are individual programs which interface to the third-party media creation tools. The modules (130) may begin the job, track its completion and run notification steps to alert the users of the end result. The modules may be programmed in virtually any language that conforms to the chosen platform. In one embodiment, the modules may comprise any UNIX executable program, such as compiled C code, Perl, or shell scripts. Modules may be tailored to CD/DVD media, NDM, e-mail, et cetera. Non-limiting examples of such modules follow.

CD Module

The CD module may create custom-content CD-ROM and DVD-ROM media. It also may allow for the creation of custom labels to be printed on the media, custom jewel case covers, transmittals, and long-term image storage. The module may be a multi-thread PERL program that interacts with a Rimage Image Server and a Rimage Production Server to create the physical media. Modules may be developed to interface with the media device and produce any format supported by the media device. For example, a module may be developed to support the following formats (the following examples are not intended to be limiting):

- Media Code I: ISO9660. This is an extremely structured CD-ROM format, which allows only lowercase 8.3 filenames. It also mandates a limit of 128 entries per directory and a full path limitation of 128 characters.
- Media Code J: Joliet format. This is a Microsoft developed ISO9660 subset that allows long file-names and increases the full path limitation to 512 characters. This format is only suitable for Windows and post-1998 Open Systems distributions.
- Media Code R: RockRidge extensions. RockRidge is a UNIX-only format that allows for long filenames, symbolic links, and UNIX file and directory permissions.

The module may be further configured to support multiple media servers with multiple CD-R drives in each server (for example, eight drives in a single server). The mediation server determines the correct module and then calls that module. The mediation server may send that module a script built by the agent according to the parameters designated in the trigger file. The parameters in the script may be tagged so that they do not have to be written in any particular order.

```
from the agent jobopt="-s $SESSION -t $RCT -c $NUMCOPIES -l
$LABEL -x $LABELLOCAL -n $NOTIFICATION -j $JOBNAME -b $ACTIVITYID -m
$MERGEFILE -p $dir/$TRFILE"

Actual module call with $jobopt as the trigger script cd $PRODDIR

/opt/bin/medalys.pl $jobopt
```

NDM Module

The NDM module may lessen the complexity and lower the costs associated with implementing Connect:Direct/NDM on Open Systems' platforms. It may further eliminate the need to procure an NDM license and maintenance agreement for each Open Systems server (the average license costs for this are $11,000 with average annual maintenance costs of $2,200) and to allocate DASD and system CPU resources for each Open Systems server. It may also reduce network costs by consolidating client network connections and reducing firewall changes and ACLs. Finally, it may also reduce educational requirements for Administrators supporting NDM on Open Systems' platforms.

The NDM module may support both email notifications, custom-exit scripts, and WWW queue viewing/job tracking.

Mail Module

This module may allow Mainframe applications to send files via email, both encrypted and non-encrypted.

Further Functionality

The system and method may be further modified to allow dynamic data to be used either with static physical labels (such as today's date being printed on a CD) or information to be integrated with electronic media (such as a mail merge). This file (merge file) may be comma delimited with a trailing comma on each line. The data lengths utilized are limited only by the physical space constraints of the media label. The merge file naming convention may be xxxxxxxx-.txt where xxxxxxxx is any 8 lower case characters. The trigger file may be modified to provide a field in the output destination record comprising a local file name containing the merge label data (i.e., xxxxxxx.txt). The agent may be modified to allow it to process the merge file when it parses it out of the trigger file.

The system and method may be further modified to provide a transmittal file comprising all of the shipping information for the media created. In such an embodiment, the transmittal data may be provided in ASCII text, formatted only with spaces, and formatted for landscape paper (132×40). The file naming convention may be xxxxxxxx.trx. Where xxxxxxxx is the same name as the trigger file.

The system and method may be further modified to support printing covers and jewel case inserts for physical media. Such functionality may require a network-connected printer. Cover art may be provided in a post-script format in the manner specified above.

Additionally, data regarding the execution of various jobs may be stored in a database associated with the mediation server. Execution data may be mined to generate chargeback reports (dates and project tracking numbers), compliance reports (success/failure reports), and trend analysis (media popularity rates).

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

We claim:

1. A computerized method for facilitating the creation of output on a medium comprising:
    directly modifying a source application to produce a trigger file in a predefined format, wherein said trigger file further comprises at least one data media indicator and wherein modifying the source application comprises writing code for the source application;
    running said source application to produce said trigger file and at least one source data file;
    sending said trigger file and said at least one source data file to a mediator wherein said mediator comprises a set of computer-executable instructions configured to interpret said trigger file and a set of parameters included in said trigger file;
    said mediator analyzing said at least one data media indicator on said trigger file;
    said mediator selecting and initiating a target media module corresponding to said at least one data media indicator wherein said target media module utilizes an interface revealed by an associated target media device; and
    said target media module processing said at least one source data file on said target media device through said interface to produce a medium comprising said at least one source data file.

2. A computerized method as claimed in claim 1 wherein said mediator comprises at least one target media module.

3. A computerized method as claimed in claim 2 wherein additional target media devices may be accommodated via the steps of:
- coding an additional target media module to correspond to an additional target media device;
- defining a data media indicator to be associated with said additional target media module; and
- storing said target media module in a memory accessible by said mediator.

4. A computerized method as claimed in claim 1 wherein said mediator is further configured to act as a router and wherein said mediator may select and initiate a target media module wherein said target media module resides on a remote server.

5. A computerized method as claimed in claim 4 wherein said mediator is further configured to initiate processing on more than one target media modules substantially simultaneously.

6. A computerized system for facilitating the creation of output on a medium comprising a processor, a source application, a mediator, and a target media module wherein:
- said source application includes a direct modification comprising computer-executable instructions configured to produce a trigger file in a predefined format, said trigger file further comprising at least one data media indicator;
- said source application further comprises computer-executable instructions configured to send at least one source data file produced by said source application along with said trigger file to said mediator;
- said mediator comprises computer-executable instructions configured to analyze said data media indicator on said trigger file;
- said mediator further comprises computer-executable instructions configured to select a target media module corresponding to said data media indicator;
- said target media module comprises computer-executable instructions configured to utilize an interface revealed by an associated target media device; and
- said target media module comprises computer-executable instructions configured to process said source data file on said target media device through said interface to produce a medium comprising said at least one source data file.

7. A computerized system as claimed in claim 6 wherein said source application provides a user interface which permits a user to specify a set of parameters for said trigger file.

8. A computerized system as claimed in claim 6 wherein said source application automatically generates a set of default parameters for said trigger file based on a request to produce media on a particular media device by a user.

9. A computerized system as claimed in claim 6 wherein said mediator further comprises an agent wherein said agent comprises computer executable instructions configured to:
- monitor a server configured to receive at least one job request from said source application;
- determine if said at least one source data file must be fragmented to be produced on a media corresponding to said data media indicator and, if so, fragment said source data file;
- send said trigger file and said at least one source data file to said mediator.

10. A computerized system as claimed in claim 9 wherein said agent is further configured to perform customized data manipulation to a set of data existing on said at least one source data file.

11. A computerized system for facilitating the creation of output on a medium comprising a processor, a source application, a mediator, and a target media module wherein:
- an at least one source data file produced by said source application is sent to said mediator;
- a trigger file is created by said source application based on a direct modification to said source application comprising a set of computer executable instructions wherein said trigger file comprises a set of parameters, in a predefined format, relating to media production which further comprises at least one data media indicator and wherein said trigger file is sent to said mediator to be processed with said source data file;
- said mediator comprises computer-executable instructions configured to analyze said data media indicator on said trigger file;
- said mediator further comprises computer-executable instructions configured to select a target media module corresponding to said data media indicator;
- said target media module comprises computer-executable instructions configured to utilize an interface revealed by an associated target media device; and
- said target media module comprises computer-executable instructions configured to process said source data file on said target media device through said interface to produce a medium comprising said at least one source data file via said target media module.

* * * * *